(12) United States Patent  (10) Patent No.: US 8,289,394 B2
Kim  (45) Date of Patent: Oct. 16, 2012

(54) SYSTEM AND METHOD FOR PROVIDING IMAGE INFORMATION USING MOBILE COMMUNICATION BASE STATION ANTENNAS

(75) Inventor: Duk-Yong Kim, Gyeonggi-do (KR)

(73) Assignee: KMW Inc. (KR)

( * ) Notice: Subject to any disclaimer, the term of this patent is extended or adjusted under 35 U.S.C. 154(b) by 396 days.

(21) Appl. No.: 12/679,096

(22) PCT Filed: Sep. 18, 2008

(86) PCT No.: PCT/KR2008/005516
§ 371 (c)(1),
(2), (4) Date: Mar. 19, 2010

(87) PCT Pub. No.: WO2009/038362
PCT Pub. Date: Mar. 26, 2009

(65) Prior Publication Data
US 2011/0193965 A1  Aug. 11, 2011

(30) Foreign Application Priority Data
Sep. 22, 2007 (KR) .......... 10-2007-0097071
Jan. 25, 2008 (KR) .......... 10-2008-0008011

(51) Int. Cl.
*H04N 7/18* (2006.01)
(52) U.S. Cl. ............ 348/159; 370/252
(58) Field of Classification Search .......... 348/159
See application file for complete search history.

(56) References Cited

U.S. PATENT DOCUMENTS

| 6,813,247 | B1 * | 11/2004 | Hassan | 370/252 |
| 6,888,565 | B1 | 5/2005 | Tanaka et al. | |
| 2002/0142800 | A1 | 10/2002 | Iimura et al. | |
| 2007/0107028 | A1 | 5/2007 | Monroe et al. | |

FOREIGN PATENT DOCUMENTS

| JP | 08065551 A | 8/1996 |
| JP | 11250369 A | 9/1999 |
| JP | 2002101031 A | 5/2002 |
| JP | 2003-116127 A | 4/2003 |
| JP | 20033296897 A | 10/2003 |
| JP | 2004088485 A | 3/2004 |
| JP | 2004320441 A | 11/2004 |
| JP | 2005117566 A | 4/2005 |
| JP | 2006121537 A | 11/2006 |
| JP | 2007165939 A | 6/2007 |
| KR | 10-2005-0015362 A | 2/2005 |
| KR | 10-2007-00024960 A | 3/2007 |

* cited by examiner

*Primary Examiner* — Joseph Avellino
*Assistant Examiner* — Marshall McLeod

(57) ABSTRACT

A system for providing image information using mobile communication BS antennas is provided, in which each of a plurality of mobile communication BS antennas has a camera module for capturing a full area where the camera module is installed and transmits BS image information captured by the camera module to a remote control system, the remote control system has a BS image DB server and stores the BS image information received from the plurality of mobile communication BS antennas on a BS basis and on an antenna basis in the BS image DB server, and a service server receives the BS image information from the BS image DB server and provides the BS image information to a user terminal.

15 Claims, 5 Drawing Sheets

SYSTEM AND METHOD FOR PROVIDING IMAGE INFORMATION USING MOBILE COMMUNICATION BASE STATION ANTENNAS

BACKGROUND OF THE INVENTION

1. Field of the Invention

The present invention generally relates to a technique for providing image information about a wide area to a terminal user over a communication network such as the Internet. More particularly, the present invention relates to a system and method for providing image information through mobile communication Base Station (BS) antennas.

2. Description of the Related Art

Owing to the development of communication networks and the rapid development of image signal processing technology and its various applications, a service for monitoring a desired area visually at a remote location is provided in various manners.

A classical example of the service is a security service using a surveillance camera. Basically, a security service system is configured with a plurality of surveillance cameras installed at appropriate positions in a monitoring area and a remote monitoring center for collecting captured information from the surveillance cameras and displaying the captured information on an appropriate display, so that a security manager can monitor the surveillance area. A fire, theft, gas leakage, etc. can be more accurately detected by additionally using sensors of various types.

To use this security service system, each user should install a set of equipments including surveillance cameras and monitoring images from the surveillance cameras has limitations in place or time.

In this context, a variety of services have recently been deployed, which provide image information to portable terminals equipped with a camera function and a transmission/reception function, such as portable phones and PDAs, over the Internet. A basic requirement for these services is installation of a plurality of (as many as possible) photographing devices at appropriate locations. Hence, there are lots of difficulties in securing installation areas, reliable power supply to the photographing devices, and management and networking of the photographing devices.

Meanwhile GOOGLE is providing the service of providing satellite photos over a global range through the Internet. The satellite images have too a low resolution to make relatively small terrestrial objects identified. Moreover, since the satellite photos are confined to aerial image data, GOOGLE also has limitations in providing information.

SUMMARY OF THE INVENTION

The present invention provides a method and system for building an efficient camera network over which image information about a wide area is easily accessible and for enabling a user to receive image information about an intended area irrespective of time and place, a business model for utilizing collected image information for various purposes, and a method for applying image information to public services.

In accordance with an aspect of exemplary embodiments of the present invention, there is provided a system for providing image information using mobile communication BS antennas, in which each of a plurality of mobile communication BS antennas has a camera module for capturing a full area where the camera module is installed and transmits BS image information captured by the camera module to a remote control system, the remote control system has a BS image DB server and stores the BS image information received from the plurality of mobile communication BS antennas on a BS basis and on an antenna basis in the BS image DB server, and a service server receives the BS image information from the BS image DB server and provides the BS image information to a user terminal.

In accordance with another aspect of exemplary embodiments of the present invention, there is provided a method for providing image information using mobile communication BS antennas, in which a terminal transmits user authentication information to a service server, the service server identifies the terminal using the user authentication information and transmits initial screen information including map information to the identified terminal, the terminal displays an initial screen for providing an image and transmits BS selection information indicating a BS that will transmit image information to the terminal to the service server, and the service server transmits the BS selection information to a BS image DB server, receives image information from the BS image DB server, and transmits the image information to the terminal.

DETAILED DESCRIPTION OF THE PREFERRED EMBODIMENTS

The configuration and operation of the present invention will be described in detail with reference to the attached drawings.

The present invention provides a method and system for installing camera modules at antennas of a plurality of mobile communication BSs in different areas and providing image information captured by the camera modules to users over a communication network.

The term "BS" is used herein in its wide sense, covering a communication device that is equipped with an antenna for wireless communications and provides a mobile communication service to terminals within its service area. Hence, a BS can be a general mobile communication BS, or a large or small relay such as an RF relay and an optical relay.

Figure 1:
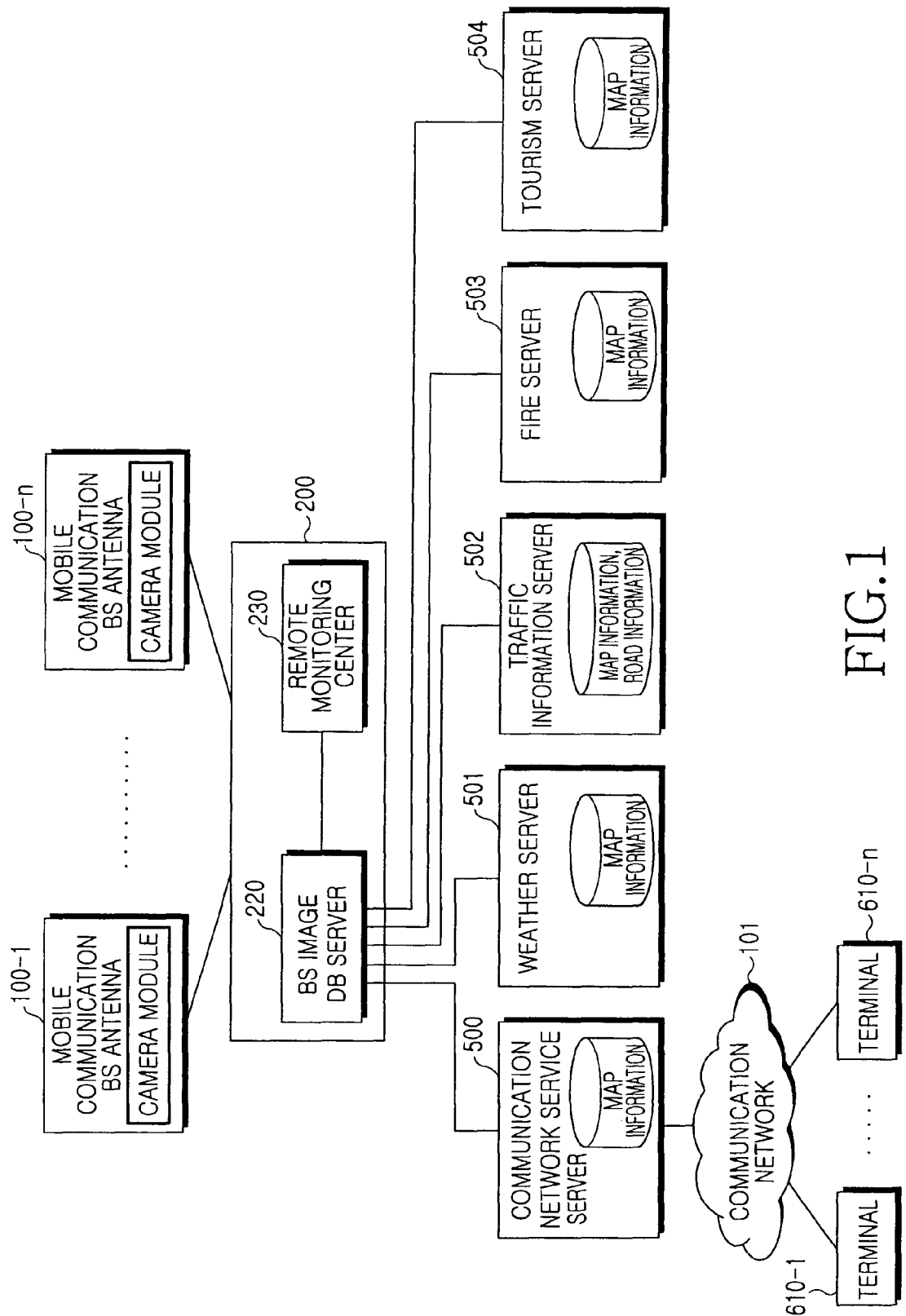
FIG. 1 is a block diagram of an image information providing system using mobile communication BS antennas according to an embodiment of the present invention.

FIG. 1 is a block diagram of an image information providing system using mobile communication BS antennas according to an embodiment of the present invention.

Referring to FIG. 1, the image information providing system according to the preferred embodiment of the present invention includes a plurality of mobile communication BS antennas 100 each having a camera module for capturing image information in a predetermined area, a remote control system 200 for storing the image information received from the plurality of mobile communication BS antennas 100 in a BS image DataBase (DB) server 220, and a service server 500 for outputting images of areas requested by users connected over a communication network to user terminals 610 according to the images stored in the BS image DB server 220, that is, the images captured by the camera modules 160 of the plurality of the mobile communication BS antennas 100.

Figure 2:
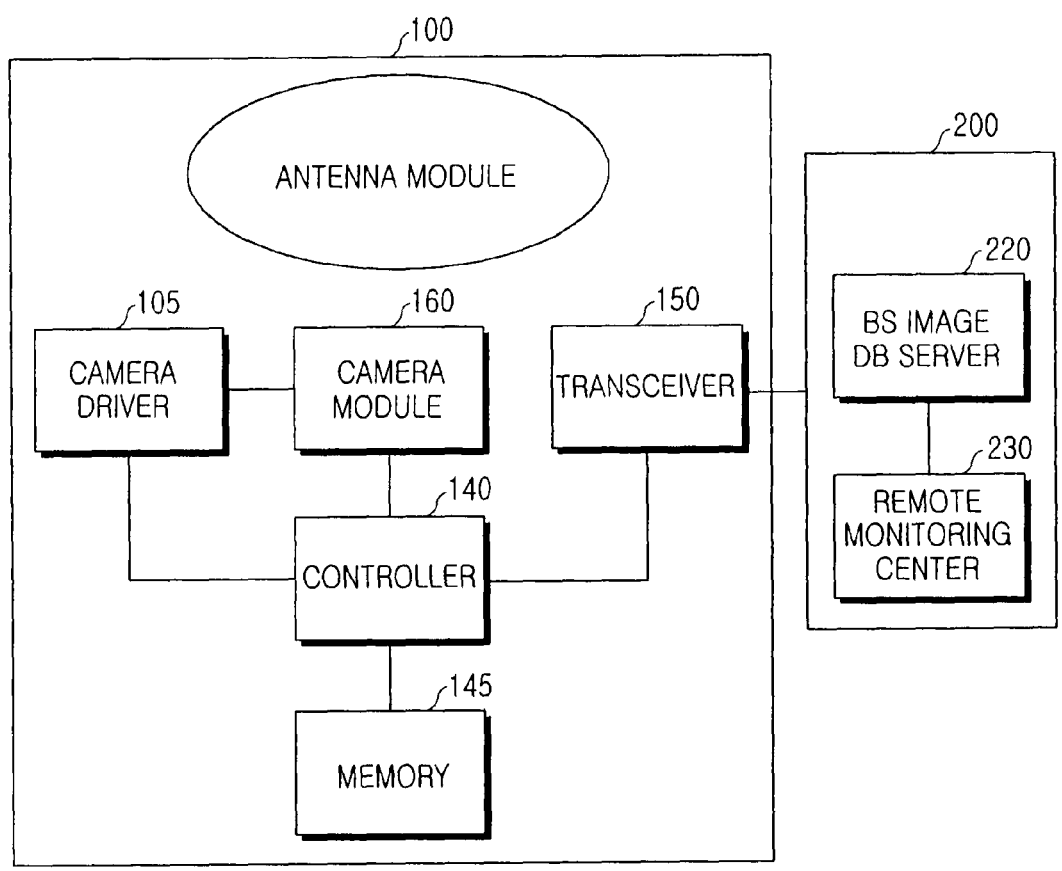
FIG. 2 is a block diagram of a mobile communication BS antenna according to an embodiment of the present invention.

The mobile communication BS antennas 100 are installed across the entire area that a mobile communication service provider services. As cameras are installed at the BS antennas 100, the service provider does not need for installing cameras additionally at particular places to provide image information about the particular places. Therefore, the problem of securing installation areas is solved, installation cost is saved, and power supply and networking of camera devices are facilitated. With reference to FIG. 2, the mobile communication BS antennas 100 will be described in detail.

FIG. 2 is a block diagram of a mobile communication BS antenna according to an embodiment of the present invention. Since a BS is typically divided into three sectors, a total of three antennas can be installed in the BS, one for each sector. Also, three camera modules can be installed, one for each antenna.

The remote control system 200 at a remote place can be connected to the antenna 100 of each BS through a Base Station Controller (BSC) and a Mobile Switching Center (MSC) of a mobile communication network. Or the remote control system 200 can be installed in the BSC or the MSC.

Referring to FIG. 2, the mobile communication BS antenna 100 according to the embodiment of the present invention includes an antenna module 110 with a typical radiation plate and a typical radiation device for transmitting or receiving mobile communication wireless signals, a camera module 160 installed appropriately in the ray dome of the antenna 100, for capturing a full service area of the antenna 100, a transceiver 150 for transmitting image information captured by the camera module 160 to the remote control system 200 and receiving a control signal from the remote control system 200, a camera driver 105 for controlling the camera module 160 according to the control signal received from the transceiver 160, a controller for providing overall control to the mobile communication BS antenna 100, inclusive of control of the operation of the camera driver 105, and a memory 145 for storing data required for the operation of the antenna 100.

The antenna module 110 is a sector antenna for transmitting a signal to a particular location or an omni-directional antenna for transmitting a signal in all directions over a wide area, as a mobile communication BS antenna.

The camera module 160 can be installed outside the ray dome of the antenna system 100, for example, on the ray dome.

The camera module 160 captures the service area of a BS and the captured image data can be temporarily stored in the memory 145. Also, the stored image data can be provided to the remote control system 200 through the transceiver 150. For instance, the image data can be set to be stored temporarily on a daily basis or on a weekly basis. When a typical mobile communication network is used, the image data can be provided to the DB server 220 in early hours without a large number of calls.

Basically, the controller 140 can control the capturing direction of the camera module 160 by transmitting a control signal received from the remote control system 200 to the camera driver 105. However, the initial capturing direction of the camera module 160 can be additionally stored in the memory 145 so that the BS antenna 100 autonomously controls the camera module 160 to the initial capturing direction.

In the mean time, the mobile communication BS having antennas usually has a BSC for providing overall control to the BS. Therefore, the BSC may be configured so as to perform the operations of the controller 140, the transceiver 150, and the memory 145 of the BS antenna 100.

The camera module 160 of the mobile communication BS 100 may be provided with a telescopic lens depending on the usage of captured image information. For night surveillance, an infrared camera can be used together with a standard camera in the camera module 160.

The camera module 160 can be set to capture still images of a relatively high quality at every predetermined interval (e.g. tens of seconds to one hour). Under the circumstances or according to the state setting of the camera module 160, the camera module 160 can be set to capture moving pictures in real time.

The remote control system 200 can include the BS image DB server 220 for accumulating image data received from the antennas 100 of each BS on a BS basis and on an antenna basis, and the remote monitoring center 230. The remote monitoring center 230 outputs the image data received from each BS in an appropriate format and can be provided with an appropriate user interface device (not shown) for outputting a control signal to each BS according to an operator's manipulation. Also, the remote control system 200 can control the camera module 160 by use of the camera driver 105 of the mobile communication BS antenna 100 upon request of a manager or an authorized service server 500.

Although the captured image data can be provided immediately to the remote control system 200, it can be stored first in the memory 145 and then provided to the BS image DB server 220 at appropriate intervals. Or the image data can be connected directly to the Internet via the transceiver 150 and stored in an Internet server.

The capturing mode of the camera module 160 is variably set according to a control signal associated with a predetermined capturing condition, received from the remote control system 200. The remote control system 200 can select a particular camera module 160 upon request of an external service server of a communication service provider and provide image data captured by the selected camera module 160. In addition, the remote control system 200 can set the capturing mode of the selected camera module 160 variably.

The transceiver 150 of the BS antenna 100 can transmit image data to the remote control system 200 on a data channel separately established between the BS and the remote control system 200. Similarly, the remote control system 200 can transmit a control signal to the BS on a separately established control channel. Besides, the transceiver 150 can transmit the image data in the same manner as a general mobile communication signal. That is, a moving picture communication channel can be established between the BS and the remote control system 200 by allocating phone numbers to the camera module 160 and the remote control system 200, for identification. In this case, the transceiver 150 is configured so as to transmit image data in a wireless mobile communication signal and the antenna module 110 receives and processes the image data, for transmission, in the same manner as done for a mobile communication signal.

The service server 500 can provide images of a particular area directly to users in real time. The service server 500 can be provided with a DB for backup of the image information and provide the backup information in a predetermined service. Also, the BS image DB server 220 can backup received images so that when a user terminal 610 requests past image information, it provides the service accordingly.

The service server 500 can also provide image information in the form of an application that the user terminal 610 can access over the communication network. The application for providing antenna images has map information including information about the locations of mobile communication BS antennas, selects a BS installed in an area of which the image information users request, and provides image information about the area to the BS.

The terminal 610 that receives the image information can be any of electronic devices that receive image information over a wired/wireless communication network and have a display for displaying the receive images to a user, including portable terminals equipped with a communication function such as a Personal Communication Service (PCS) phone, a CDMA-2000 (1×, 3×) phone, a Dual Band/Dual Mode phone, a Global Standard for Mobile (GSM) phone, an International Mobile Telecommunication-2000 (IMT-2000) phone, a Digital Multimedia Broadcasting (DMB) phone, a smart phone, and a hand-held phone, and network terminals such as a laptop, a PC, and an Internet Protocol TV (IPTV).

To use the image information, the terminal 610 connects to the service server 500 over a predetermined communication network 101. The communication network 101 can be a wired one such as an Integrated Services Digital Network (ISDN), an Asymmetric Digital Subscriber Line (ADSL), a TCP/IP-based communication network, and an optical communication network. Or the communication network 101 can be a wireless one like a Wideband Code Division Multiple Access (WCDMA) network, a Wireless Local Area Network (WLAN), a High Speed Downlink Packet Access (HSDPA) network, a Wireless Broadband Internet (WiBro), and a World interoperability for Microwave Access (WiMAX) network.

Figure 3:
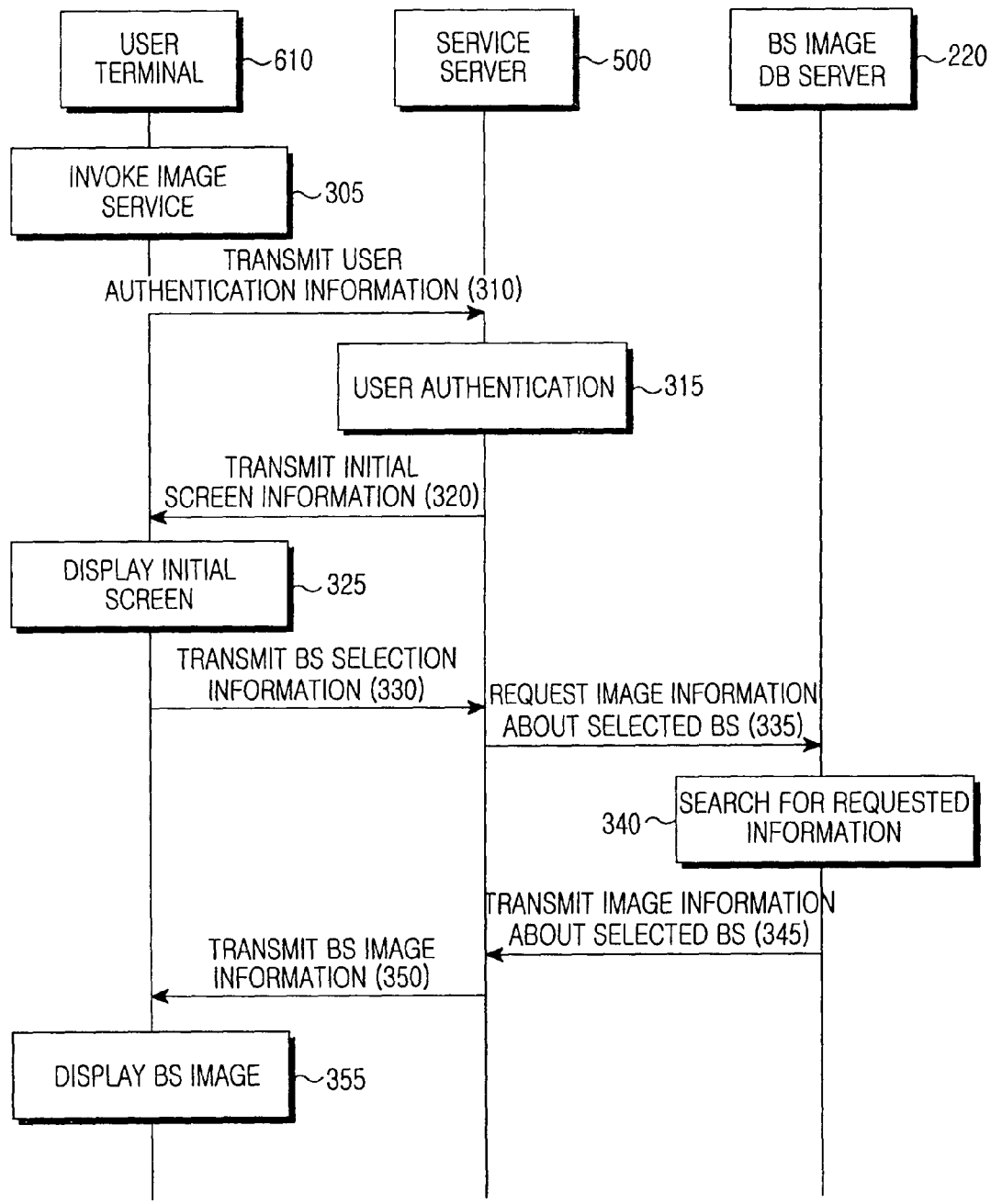
FIG. 3 is a diagram illustrating a signal flow for an image information providing method using mobile communication BS antennas according to an embodiment of the present invention.

Now a description will be made of an operation for providing image information using BS antennas according to an embodiment of the present invention. FIG. 3 is a diagram illustrating a signal flow for an image information providing method using mobile communication BS antennas according to an embodiment of the present invention. Referring to FIG. 3, the user terminal 610 invokes an image service application in step 305 and transmits user authentication information including a phone number, a unique number, or a user ID of the terminal 610 to the service server 500 in step 310. The user of the terminal 610 can be a member that has registered to the service server. If the image service is paid service, the user is one that pays for the use of the image service. In step 315, the service server 500 performs user authentication by analyzing the received user authentication information. If the user authentication information reveals that the user is not authorized, if the user authentication information is wrong, or if the user authentication information indicates that the user is not a member in the case of a membership service, image information cannot be provided to the user. In step 320, the service server 500 transmits initial screen information including map information for the image service to the user terminal 610. The user terminal 610 displays the map information in step 325. The user can select an intended BS or an area where the intended BS is located by moving on, scaling up, scaling down, or searching the displayed map. In this case, each BS can be represented by an appropriate icon at a location corresponding to the BS on the map. When the user clicks on the icon, it is considered that the user selects the BS. In step 330, the user terminal 610 transmits BS selection information to the service server 500. The service server 500 requests image information about the BS indicated by the NS selection information to the BS image DB server 220 in step 335. The BS image DB server 220 searches for the requested image information in step 340 and transmits the image information to the service server 500 in step 345. In step 350, the service server 500 transmits the image information about the BS to the user terminal 610. The user terminal 610 displays the received image information in step 355. In this manner, the image information providing method of the present invention can provide the image service using BS antennas.

Figure 4:
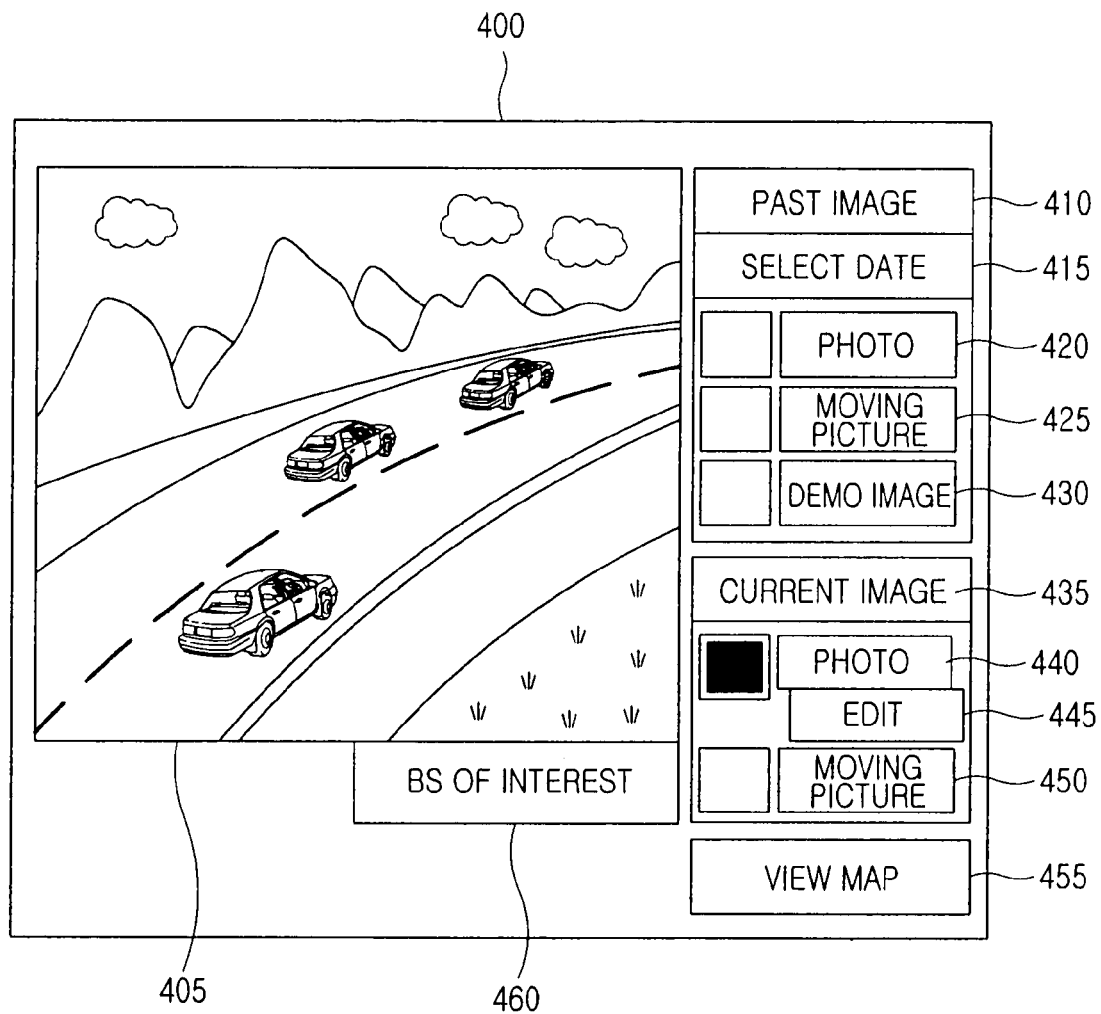
FIG. 4 illustrates an exemplary display of a terminal in an image information service using mobile communication BS antennas according to an embodiment of the present invention.

FIG. 4 illustrates an exemplary display of a terminal in an image information service using mobile communication BS antennas according to an embodiment of the present invention.

Referring to FIG. 4, the terminal 610 receives image information from the service server 500 and displays the image information on a display 400. The terminal 610 can also display various menu items that the user can select. For example, a display window 405 for displaying current selected image information and menu items for selecting detailed image information are displayed. The menu items include Current Image 435 for selecting a current image of a BS, Past Image 410 for selecting a past image of the BS, and View Map 455 for returning to a map.

Current Image 435 has, as its submenus, Photo 440 for displaying image information of the BS in the form of a photo and Moving Picture 450 for displaying image information of the BS in the form of moving pictures. Edit 445 can be placed under Photo 440, for displaying the latest updated photo information.

Past Image includes, as its submenus, Select Date 415 for selecting the date and time of an intended image, Photo 420 for viewing image information about the BS in the form of a photo, Moving Picture 425 for viewing image information about the BS in the form of moving pictures, and Demo Image 430 for viewing a demo image preliminarily prepared by a service provider server that provides the image service. The demo image can be BS image information, tourist information about an area, or local information about the area, which has been edited in advance on the basis of a predetermined time, on a monthly basis, on a yearly basis, or on a season basis.

Also, Register BS of Interest 460 can further be included to register a BS in a BS of interest list.

Meanwhile, the terminal can be a PC or a portable terminal. These menu items can be selected by clicking with a mouse when the terminal is a PC like a desktop or a laptop and by button click or touch screen input when the terminal is a portable terminal like an IPTV or a hand-held phone.

A profit model that can create profits by utilizing image information acquired from a camera module of a mobile communication BS antenna will be described below.

Image data captured by the camera module of each BS and stored in the BS image DB server 220 can be provided to various service servers that need them via dedicated lines. For example, in FIG. 1, the service servers are a weather server 501 for monitoring a local weather status of a particular area using images captured by the camera module 160 of the mobile communication BS antenna 100 and announcing a weather warning to the area if there is an abnormal symptom of weather, a traffic information server 502 for receiving image information captured by the camera module 160 of the mobile communication BS antenna 100, determining the traffic status of the area, and providing traffic information based on the traffic status, a fire server 503 for determining whether a fire has occurred based on the image information of the camera module 160 in relation to a fire report and thus detecting a fire occurrence early, and a tourism server 504 for providing image information about sightseeing places around the world in conjunction with fields requiring tour information and local information, such as a tour agency.

Referring to FIG. 1, the service server 500 can be a portal server for providing a map service, a tour information server for providing tour information over the Internet, or a geographical information server for providing geographical information. This service server 500 stores an image signal received from the camera module 160 in real time or at every predetermined interval, or displays it in real time.

If the service server 500 is a portable server for providing a map and geographical information service or a geographical server for providing a geographical information service, it displays a map or geographical information about an area in the user terminal 610, upon request of the user terminal 610 for the map or geographical information about the area.

When the user terminal 610 requests display of image information about the area corresponding to the map or geographical information while the map or geographical information is displayed, an image signal captured by the camera module 160 of a mobile communication BS antenna 100 servicing the area can be displayed in the user terminal 160 by streaming.

The mobile communication BS antenna 100 is installed in a sightseeing place like a national park or a beach as well as a metropolitan area. Upon request of the terminal 610, the mobile communication BS antenna 100 provides real-time moving pictures or still images of the sightseeing place. Hence, the terminal 610 receives tour information in real time.

In this manner, a user of the service server 500 can monitor the topography or buildings or traffic status of an area without moving to the area through his terminal 610.

Due to the resulting remarkable decrease in equipment investment cost, the service server 500 can provide a high-quality service and attract more users, thereby creating profits in many aspects.

To display information in a low-specification terminal 610, the service server 500 converts image captured by the camera module 160 of the mobile communication BS antenna 100 to still images on a predetermined time basis and sequentially displays the still images in the terminal 610.

Since the service can be provided to the terminal 610 regardless of the specification of the terminal 610, the service range is broadened, further contributing to profit creation.

Figure 5:
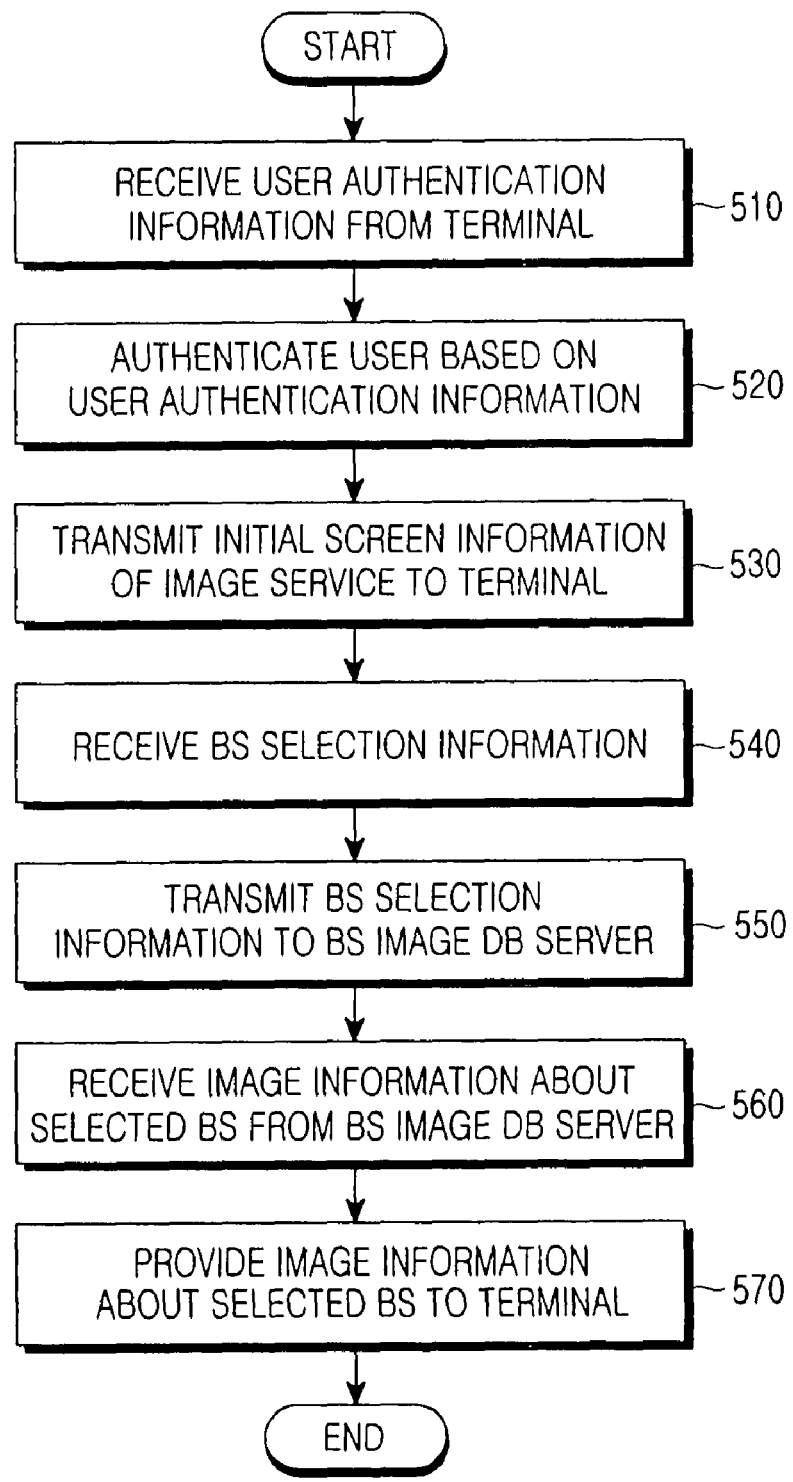
FIG. 5 is a flowchart illustrating an operation of a service server when providing images from BS antennas according to an embodiment of the present invention.

FIG. 5 is a flowchart illustrating an operation of a service server when providing images from BS antennas according to an embodiment of the present invention. Referring to FIG. 5, the service server receives user authentication information from the terminal over a predetermined communication network in step 510 and performs user authentication based on the received user authentication information in step 520. In steps 510 and 520, the service server can be utilized in various fields to provide image information as a weather server, a traffic information server, a fire server, and a tour information server according to its usage, as described before. The service server transmits initial screen information including map information and/or BS list information to the terminal identified during the authentication over the predetermined communication network in step 530. The initial screen information can also be modified for a predetermined purpose such as weather, traffic, fire, and tour information. In step 540, the service server receives BS selection information from the terminal. According to its purpose, the terminal may select a single BS from which to receive image information. Or the terminal may select a particular area and receive image information from all BSs within the area and displays the image information sequentially or separately in segments. If image information of some BSs is required, the BSs are registered as BSs of interest. In step 550, the service server requests image information of a BS indicated by the BS selection information to the BS image DB server. The request message includes information indicating whether the requested image information is a still image or a moving picture and whether the requested image information is a current image or a past image. The service server receives the image information of the BS from the BS image DB server in step 560 and transmits the image information to the terminal 610 in step 570.

As a service that was never expected conventionally is provided by use of the camera module 160 of the mobile communication BS antenna 100, an additional profit is created on the part of a mobile communication service provider operating the mobile communication BS antenna 100.

When images captured by the camera module 160 of the mobile communication BS antenna 100 are connected to public servers such as servers of government and public offices, the government and public offices can monitor their managed areas without the need for additional monitoring systems, thereby increasing the quality of public services.

The weather server 501 can be a server of a local weather service station or a main server of a meteorological administration. The weather server 501 can cope with elusive weather changes more actively by use of images captured by the camera module 160 of the mobile communication BS antenna 100.

To reinforce weather monitoring, a hygrometer, a thermometer, and a rain gauge are additionally provided to the mobile communication BS antenna 100. Since the humidity, temperature, and precipitation of the area are easily measured from the hygrometer, the thermometer, and the rain gauge, a necessary action such as issuing a weather warning can be taken rapidly. Also, the mobile communication BS antenna 100 can be applied to a disaster prevention system against storm and heavy rain through direct observation of wind and clouds, especially real-time observation of typhoons or hurricanes.

The traffic information server 502 managed by a traffic administration, a road traffic authority, or a traffic broadcasting station can monitor the traffic status of a particular area in real time. According to the traffic status, an action such as guidance to a bypass road can be taken rapidly against a traffic jam.

To monitor traffic status in real time, the traffic administration installs cameras in major interchanges of a large city or chronic bottlenecks. However, cameras cannot be installed along all roads due to their installation cost.

However, the use of the camera module 160 of the mobile communication BS antenna 100 enables real-time monitoring of main roads all over the country and effectively relieves traffic congestion by guidance to a bypass road over a wide area.

The fire server 503 managed by a national emergency management agency or a local fire station can reduce the movement rate of fire engines involving prank calls by actively utilizing image information captured by the camera module 160 of the mobile communication BS antenna 100. Hence, without an additional equipment investment, a fire occurrence can be detected easily.

Since mobile communication BS antennas 100 are installed in remote and secluded areas as well as large cities, a natural forest fire is also detected early and thus extinguished early. Therefore, nature destruction and environment contamination caused by forest fire spreading can be prevented.

Upon receipt of a fire report about a particular area along with the fire monitoring, the fire server 503 checks images from the camera module 160 that captures the particular area and determines whether the fire report is true. Also, images from the camera module are used to identify the cause of a fire.

That is, in the absence of a fire symptom in the images of the area received from the camera module 160, no action is taken against a fire, determining that the fire report is wrong or a prank.

The resulting prevention of unnecessary movement of fire equipment and personnel to an area caused by a wrong report or a prank report saves cost and enables more effective handling of a real fire.

If the image information about the area captured by the camera module 160 upon receipt of the fire report indicates a probable fire, fire equipment and personnel are moved to the area.

If image information about a sightseeing place and a particular area, the tourism server 504 can be operated so as to transmit image information about the area in real time and at a desired time.

The user can receive high-quality image information about an intended sightseeing place in advance and utilize it as tour information. A so-called cyber tour is possible using image information about various areas. In this manner, the image information can be utilized for various purposes.

Images captured by the camera modules 160 of mobile communication BS antennas 100 installed around the country can find their use in a large number of applications. If a secondary service provider or a public office uses the images, a high profit is created because there is no additional equipment for providing the above-described services.

For example, when a police agency or a local police station operates a police server using the image service, it can utilize images captured by the camera module 160 of the mobile communication BS antenna 100 in crime prevention and search for hit-and-run vehicles. Also, the police server can be authorized to control the camera module 160 of the antenna 100. Past images can be utilized in many fields including criminal track-down and evidence collection.

A military server operated by a defense ministry or an army unit can use image information captured by the camera module 160 of the mobile communication BS antenna 100, for guard reinforcement and military operations.

As is apparent from the above description, the mobile communication BS-based image information providing method and system of the present invention install camera modules in BS antennas installed widely in many areas and acquire image information about an intended area. Therefore, the constraint of securing camera installation areas is eliminated, power supply and management of camera devices are facilitated, and thus installation, maintenance, and management costs are saved. Further, camera networking is efficient and users can easily acquire image information about desired areas from any place over a communication network such as a mobile communication network or the Internet. If service providers in different countries connect their services, image information about each area around the world can be easily monitored. Also, since collected image information can be utilized for various purposes in the fields of profit-making businesses and public services involving weather, traffic, fire, tourism, military, police, an efficient image service an be provided.

While the invention has been shown and described with reference to certain embodiments of the present invention thereof, it will be understood by those skilled in the art that various changes in form and details may be made therein without departing from the spirit and scope of the present invention as defined by the appended claims and their equivalents.

For example, while the service server 500 services image information stored in the BS image DB server 220 to the terminal 610, upon request of the terminal 610, it can be further contemplated that the service server 500 is provided with a backup DB and thus provides image information stored in the backup DB to the terminal without requesting the image information to the BS image DB server 220.

Although the BS image DB server 220 is disclosed as a single logical component, it can be configured with a plurality of geographically distributed DBs or DBs of the BS, or it can be an Internet server, in real implementation.

While it has been described that the BS image DB server 220 is in the remote control system 200, it can be separated from the remote control system 200 as it can be an Internet server connected over the Internet, and the remote control system 200 may have only BS list information. In this case, the BS can temporarily store captured images and transmit them to the BS image DB server 220 at predetermined intervals.

The above-described embodiments of the present invention are those that can be basically realized using image information of BS antennas. Aside from the embodiments of the present invention, image information can be used in various ways. For example, the user terminal 610 can directly connect to a BS (or an antenna) in an intended area over a communication network and receive image information from the BS, instead of the service server 500. In this case, when the user terminal 610 requests BS information to the remote control system 200 in a preset manner, the remote control system 200 connects the user terminal 610 directly to the BS.

The invention claimed is:

1. A system for providing image information using mobile communication Base Station (BS) antennas, comprising:
a plurality of mobile communication BS antennas, each having a camera module for capturing a full area where the camera module is installed, for transmitting BS image information captured by the camera module to a remote control system, each of the mobile communication BS antennas includes:
an antenna module including a typical radiation plate and a typical radiation device for transmitting or receiving a radio signal for a mobile communication service;
the camera module being installed in a ray dome of the antenna for capturing a full service area of an antenna system;
a transceiver for transmitting image information captured by the camera module to the remote control system and receiving a control signal from the remote control system;
a camera driver for controlling the camera module according to the control signal received from the remote control system through the transceiver;
a controller for providing overall control to operations of the mobile communication BS antenna including an operation of the camera driver; and
a memory for storing data for the operations of the mobile communication antenna;
wherein the controller controls a capturing direction of the camera module by transmitting the control signal received from the remote control system to the camera driver and stores an initial capturing direction of the camera module in the memory, so that the mobile communication BS antenna controls the camera module to the initial capturing direction;
the remote control system having a BS image DB server, for storing the BS image information received from the plurality of mobile communication BS antennas on a BS basis and on an antenna basis in the BS image DB server; and a service server for receiving the BS image information from the BS image DB server and providing the BS image information to a user terminal;

wherein three mobile communication BS antennas are installed in a general three-sector BS, one for each sector, and three camera modules are installed in the mobile communication BS antennas, one for each sector.

2. The system of claim 1, wherein the antenna module is one of a sector antenna for transmitting a signal to a predetermined location and an omni-directional antenna for transmitting a signal in all directions over a wide area.

3. The system of claim 1, wherein the camera module is installed outside the ray dome of the BS antenna.

4. The system of claim 1, wherein the camera module includes one of a telescopic lens according to a usage of the image information captured by the camera module and an infrared camera for night surveillance.

5. The system of claim 1, wherein the controller sets the camera module to capture one of a still image and a moving picture at every predetermined interval.

6. The system of claim 1, wherein the transceiver transmits the image data to the remote control system on a data channel established between the BS and the remote control system, and the remote control system transmits the control signal to the transceiver on a control channel.

7. The system of claim 1, wherein phone numbers are allocated to the transceiver and the remote control system, and the transmission of the image data from the transceiver to the remote control system and the transmission of the control signal from the remote control system to the transceiver are performed in the same manner as typical transmission and reception of mobile communication service signals.

8. The system of claim 1, wherein the remote control system is installed at a remote location through a Base Station Controller (BSC) or a Mobile Switching Center (MSC) of a mobile communication network, or directly installed in the BSC or the MSC.

9. The system of claim 1, wherein the remote control system comprises:

the BS image DB server for storing the image data received from the BS antennas on a BS basis and on an antenna basis; and a remote monitoring center for outputting the image data received from each BS in an appropriate format and transmitting the control signal for controlling the camera module to the each BS.

10. The system of claim 1, wherein the service server comprises a DB.

11. The system of claim 1, wherein the service server provides image information in the form of an application to which the terminal can connect over a communication network and has map information including information about locations where the BS antennas are installed.

12. A method for providing image information using mobile communication Base Station (BS) antennas, comprising:

transmitting user authentication information to a service server by a terminal;

identifying the terminal using the user authentication information and transmitting initial screen information including map information to the identified terminal by the service server;

displaying an initial screen for providing an image by the terminal;

transmitting BS selection information indicating a BS that will transmit image information to the terminal to the service server by the terminal;

transmitting the BS selection information to a BS image DB server by the service server; and receiving image information from the BS image DB server and transmitting the image information to the terminal by the service server;

wherein the mobile communication BS antennas include:

a plurality of mobile communication BS antennas, each having a camera module for capturing a full area where the camera module is installed, for transmitting BS image information captured by the camera module to a remote control system, each of the mobile communication BS antennas includes:

an antenna module including a typical radiation plate and a typical radiation device for transmitting or receiving a radio signal for a mobile communication service;

the camera module being installed in a ray dome of the antenna for capturing a full service area of an antenna system;

a transceiver for transmitting image information captured by the camera module to the remote control system and receiving a control signal from the remote control system;

a camera driver for controlling the camera module according to the control signal received from the remote control system through the transceiver;

a controller for providing overall control to operations of the mobile communication BS antenna including an operation of the camera driver; and a memory for storing data for the operations of the mobile communication antenna;

wherein the controller controls a capturing direction of the camera module by transmitting the control signal received from the remote control system to the camera driver and stores an initial capturing direction of the camera module in a memory, so that the mobile communication BS antenna controls the camera module to the initial capturing direction the remote control system having a BS image DB server, for storing the BS image information received from the plurality of mobile communication BS antennas on a BS basis and on an antenna basis in the BS image DB server; and a service server for receiving the BS image information from the BS image DB server and providing the BS image information to a user terminal;

wherein three mobile communication BS antennas are installed in a general three-sector BS, one for each sector, and three camera modules are installed in the mobile communication BS antennas, one for each sector.

13. The method of claim 12, wherein the user authentication information includes identification information of the terminal.

14. The method of claim 12, wherein if a user selects one BS, the BS selection information includes identification information of the selected BS, if the user selects an area, the BS selection information includes identification information of all BSs within the area, and if the user selects a BS of interest list, the BS selection information includes identification information of BSs listed in the BS of interest list.

15. The method of claim 12, wherein the BS selection information includes information indicating whether user-requested image information is a still image or a moving picture and information indicating whether the user-requested image information is a current image or an image at a past time.

* * * * *